United States Patent [19]

McLaren

[11] 4,344,814

[45] Aug. 17, 1982

[54] APPARATUS FOR HEAT SEALING ROUND CONTAINERS

[75] Inventor: Edwin C. McLaren, Apple Valley, Minn.

[73] Assignee: Champion International Corporation, Stamford, Conn.

[21] Appl. No.: 304,590

[22] Filed: Sep. 22, 1981

Related U.S. Application Data

[62] Division of Ser. No. 108,034, Dec. 28, 1979, Pat. No. 4,305,771.

[51] Int. Cl.[3] .......................... B32B 31/20; B32B 1/08

[52] U.S. Cl. ...................................... 156/581; 53/458; 100/93 P; 156/69; 156/227; 156/309.6; 156/583.91; 219/243; 229/4.5; 229/5.5; 229/24; 229/37 E; 428/35; 428/121; 493/133; 493/140; 493/152

[58] Field of Search .................... 53/458, 459; 156/69, 156/198, 227, 290, 308.4, 309.6, 581, 583.91; 229/4.5, 5.5, 24, 37 E, 37 R; 428/35, 64, 121, 122, 140, 152; 493/133, 140, 152, 157, 158, 167, 295, 108, 34; 100/93 P; 219/243

[56] References Cited

U.S. PATENT DOCUMENTS

| | | | |
|---|---|---|---|
| 2,367,749 | 1/1945 | Barbieri | 493/59 |
| 3,336,847 | 8/1967 | Durat | 493/56 X |
| 4,282,699 | 8/1981 | Embro | 219/243 X |

*Primary Examiner*—Edward C. Kimlin
*Assistant Examiner*—Robert A. Dawson
*Attorney, Agent, or Firm*—Evelyn M. Sommer

[57] ABSTRACT

A multi-piece, tub shaped paperboard container having a circular opening in the top thereof is provided with a multi-piece, reinforced rim coated with a layer of meltable plastic and is assembled by appying heat to overlapping seams in order to melt the plastic coating and thereby seal the seams. Heat is applied evenly around the entire periphery of the rim by a 2-piece, annularly shaped, heated collar which may be selectively shifted into conforming engagement with the container. The even application of heat around the entire periphery of the rim equalizes the surface tension of the plastic coating during melting thereof to avoid deformation of the rim during the heat sealing process.

1 Claim, 4 Drawing Figures

Fig. 1.
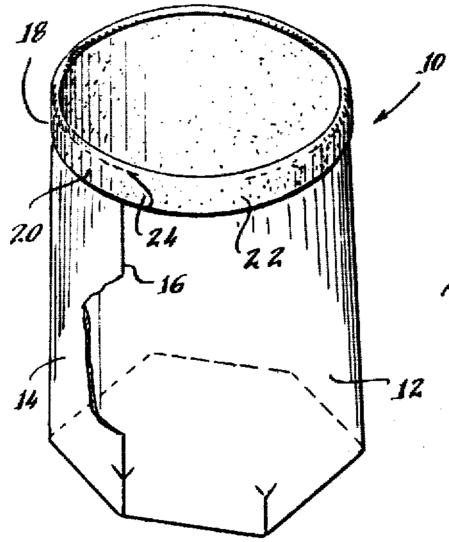
Fig. 2.
(PRIOR ART)
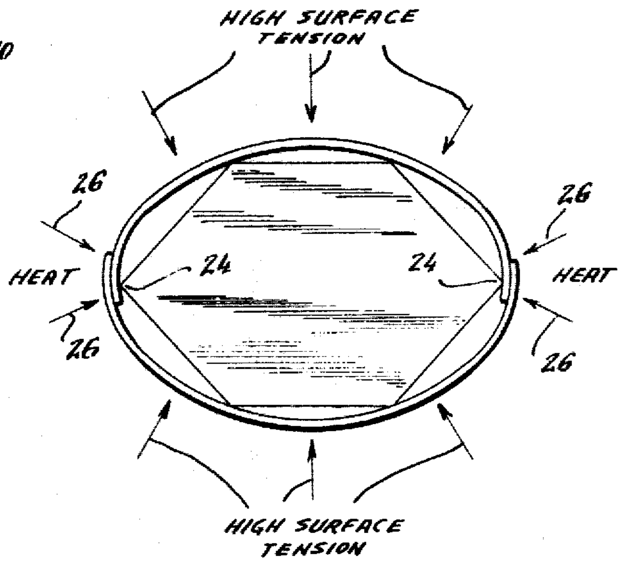
Fig. 3.
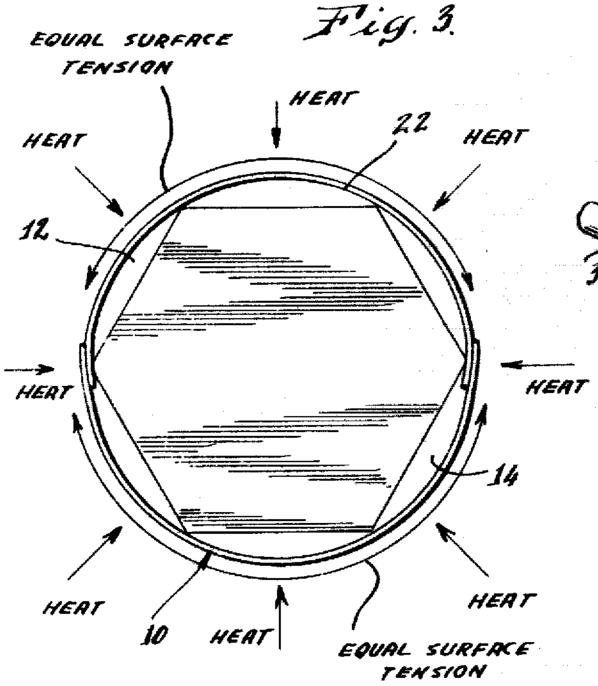
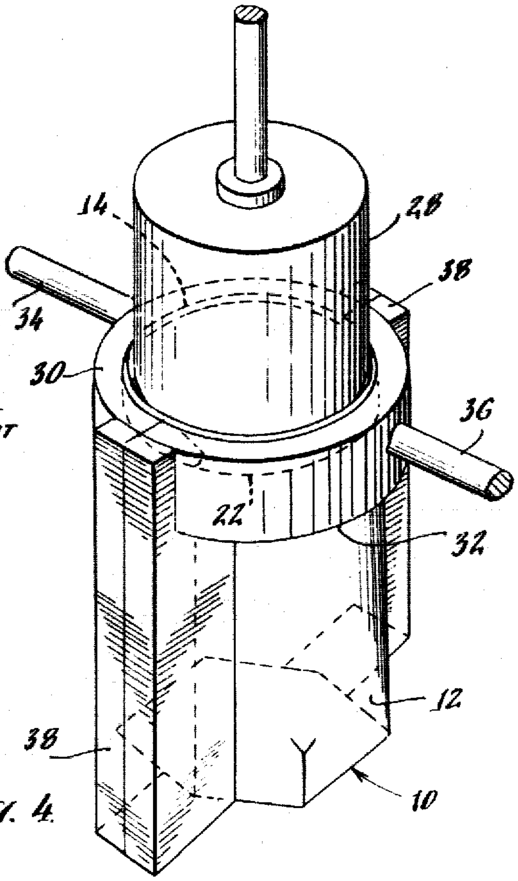
Fig. 4.

APPARATUS FOR HEAT SEALING ROUND CONTAINERS

This is a division of application Ser. No. 108,034, filed Dec. 28, 1979, and now Pat. No. 4,305,771.

TECHNICAL FIELD

The present invention generally relates to the art of heat sealing the various components of a paperboard container, and deals more particularly with a novel method and related apparatus for heat sealing a multi-piece rim of a tub shaped carton in a manner to prevent deformation of the rim.

BACKGROUND AND BRIEF DESCRIPTION OF THE INVENTION

Tub shaped cartons, i.e. those which are generally cylindrical in shape having one end thereof which is essentially open and is adapted to receive a closure lid thereon, are often formed from a blank comprising a single sheet of paperstock which is folded to form a plurality of overlapping, side wall seams which must be bonded together in order to secure the container in an erected form. Containers of the type mentioned above may also be further provided with a multi-piece, multi-ply reinforcement rim formed integral with the side walls which surrounds the opening in the top of the container.

Selective portions of the paperstock forming the container blank are coated with a layer of a heat meltable plastic which provides the two fold function of providing a moisture impervious lining inside the container and acting as a bonding medium between overlapping seams of the carton.

As will be discussed more fully hereunder, the prior method for sealing the seams in the side walls and rim of the carton consisted of applying localized heat to such seams in order to melt the plastic material between the overlapping layers of the paperboard, thereby bonding and sealing the same. This prior art method, and associated apparatus for performing the same, are subject to one serious objection. Upon application of localized heat to the seams during the sealing process, the opening surrounding the top of the container, that is, the rim, is permanently deformed into an oval shape. The resulting oval shaped rim is undesirable, of course, both from an esthetic as well as a functional standpoint; for example, difficulty is encountered in fitting the deformed, oval shaped rim with a circularly shaped closure lid.

Accordingly, it is a primary object of the present invention to provide a novel method and related apparatus for heat sealing the seams of a tub shaped carton in a manner which avoids deformation of the rim. This, and further objects of the invention will become clear, or be made apparent during the course of the following description.

According to the present invention, apparatus for implementing the novel method includes a multi-piece, annularly shaped, heated collar which is shiftable into engagement with the rim of a container and conformingly engages the entire periphery of the latter. Heat is applied evenly along the entire periphery, or length of the rim, thereby heating the entire rim, rather than isolated portions thereof, which equalizes the surface tension of the plastic coating on the rim. Equalization of the surface tension of the plastic coating along the rim eliminates deformation thereof during the heat sealing process to allow consistently repeatable fabrication of a nearly perfectly round rim.

DESCRIPTION OF THE DRAWINGS

In the drawings, which form an integral part of the specification and are to read in conjunction therewith, and in which like parts are designated by like reference numerals in the various views:

FIG. 1 is a perspective view of a tub shaped carton formed by the method and apparatus of the preferred form of the present invention, parts being broken away to reveal overlapping seams thereof, and in wherein stipling indicates a layer of plastic coating applied to selective portions of the container;

FIG. 2 is a combined top plan, and diagramatic view of a tub shaped container formed in accordance with a prior art heat sealing process;

FIG. 3 is a combined top plan and diagramatic view of the container of FIG. 1 formed in accordance with the method and apparatus of the preferred form of the present invention; and FIG. 4 is a perspective view of the container shown in FIGS. 1 and 3 during the heat sealing process of the present invention, wherein the heated collar is shifted to an operated, heat sealing position.

DETAIL DESCRIPTION OF THE INVENTION

Referring first to FIG. 1, the present invention involves a novel method and associated apparatus for heat sealing the various components of a tub shaped container generally indicated by the numeral 10. The container 10 is formed from a blank comprising a single sheet of paperstock cut and configured to be folded into a generally cylindrical shape defined by a pair of cylindrically shaped side wall sections 12 and 14 respectively. Side wall sections 12 and 14 overlap each other along a longitudinally extending seam 16. A reinforced rim 18 surrounding the open, circular top of the container 10 is formed from a pair of elongate strips of paperboard material 20 and 22 which are foldably connected to the corresponding side wall sections 14 and 12 and are disposed in overlapping relationship to the latter to form a double ply thickness of material. Sections 20 and 22 of the rim 18 may overlap each other as at 24.

One side of the blank from which the container 10 is formed may be coated with a layer of heat meltable plastic material such as polyethylene or the like. After the blank has been folded into the erected, container configuration, a layer of such plastic material is interposed between the layers of paperboard material defining the seam 16 and seam 24. The seams 16 and 24 are sealed by means of the application thereto of a sufficient quantity of heat to melt the plastic thereby bonding the overlapping plies of paperboard together.

The prior art method of heat sealing the seams 16 and 24, shown in FIG. 2, involved the application of localized heat only to the seams 22 and 24, as indicated by the arrows 26. After the application of heat at locations 26, the rim 18 was deformed from a circular to an oval shape which was incompatiable with the fitting therewith of a circularly shaped closure lid (not shown). The present invention involves, in part, recognition that the deformation of the rim 18 into an oval shape resulting from the prior art heat sealing process is due to the fact that the surface tension of the coating of plastic on the strips 20 and 22 of the rim 18 between the seams 16 and 24 possesses a relatively high surface tension compared with the low surface tension of such material at seams 16 and 24 which is brought about by the effects of heat being applied to the material only at seams 16 and 24.

Referring now also to FIGS. 3 and 4, the method of the present invention involves the application of essentially equal amounts of heat to the entire length or periphery of the rim 18 during the application of heat to the seams 16 and 24. By such even application of heat to the entire periphery of the rim 18, the coating of plastic material thereon is melted to essentially equal degree, thereby equalizing the surface tension of such plastic; by equalizing the surface tension of the plastic coating on the rim 18, the rim 18 retains its circular shape both during and after the heat sealing process.

The method of the present invention may be carried out using apparatus shown in FIG. 4. The apparatus of the present invention comprises a cylindrically shaped, male plug member 28 which may be inserted into the interior of the container 10 and conformingly engages the interior side walls thereof. A shiftable, multi-piece collar assembly comprises a first and second arcuately shaped collar 30 and 32 respectively. Collars 30 and 32 are respectively secured to suitable support structure 34 and 36 which shiftably mount the collars 30 and 32 for reciprocal movement toward and away from each other. The interior surface areas of collars 30 and 32 correspond in geometry to the exterior surface of the side walls of container 10 and conformingly engage the entire rim 18 when shifted from a standby position, spaced from the rim 18, to an operated position in which the collars contact the rim 18 and completely surround the latter. An extension 38 may be secured to one of the collar sections, for example collar section 30, and extends longitudinally in overlapping, abutting engagement with the seams 16 when the collar assembly is shifted to its operated position. The collar sections 30 and 32 as well as the extension 38 may include an electrical heating element (not shown) formed integral therewith for heating the collar assembly to a desired temperature.

When the collar assembly is heated to the desired temperature, collar sections 30 and 32 are shifted to their operated position and apply heat evenly to the entire periphery of the rim 18 as well as along the seam 16, thereby evenly heating the coating of plastic material around the rim 18 and along the seam 16, whereupon the seams 16 and 24 are effectively heat sealed. After the pre-selected amount of heat is applied to the seams 16 and 24, the collar sections 30 and 32 are shifted to their standby position and the container 10 is separated from the male plug 28.

From the foregoing, it is apparent that the method and apparatus of the present invention not only provide for reliable accomplishment of the object of the invention but do so in a particularly simple and effective manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. Apparatus for sealing together a multi-piece circular rim in a tub shaped container, comprising:

a male plug member adapted to be inserted into the interior of said container and having surface portions for conformingly engaging the surface of said rim inside said container; and a heated press assembly including:

(1) a multi-piece, annularly shaped, shiftably mounted collar having surface areas adapted to surround the entire periphery of said rim and adapted to conformingly engage the exterior surface of said rim, at least certain of the pieces of said multi-piece collar being shiftable from a standby position spaced from said rim to an operated position in engagement with said rim, and (2) electrical heating means carried by each of said pieces of said multi-piece collar and adapted to be coupled with a source of thermal energy, said plug member, said collar and heating means cooperating to apply heat evenly around the entire periphery of said rim when said collar is shifted to said operated position thereof.

* * * * *